(12) United States Patent
Nieten et al.

(10) Patent No.: US 9,387,741 B2
(45) Date of Patent: Jul. 12, 2016

(54) ELASTOMERIC THERMAL BARRIER AS WELL AS GAS SPRING ASSEMBLY AND SUSPENSION SYSTEM INCLUDING SAME

(71) Applicant: Firestone Industrial Products Company, LLC, Indianapolis, IN (US)

(72) Inventors: Jason D. Nieten, Noblesville, IN (US); Pradipta N. Moulik, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 75 days.

(21) Appl. No.: 14/039,755

(22) Filed: Sep. 27, 2013

(65) Prior Publication Data

US 2014/0091506 A1    Apr. 3, 2014

Related U.S. Application Data

(60) Provisional application No. 61/708,017, filed on Sep. 30, 2012.

(51) Int. Cl.
| | |
|---|---|
| *F16F 9/04* | (2006.01) |
| *B60G 11/27* | (2006.01) |
| *F16F 9/05* | (2006.01) |

(52) U.S. Cl.
CPC . *B60G 11/27* (2013.01); *F16F 9/05* (2013.01); *B60G 2202/152* (2013.01); *B60G 2204/125* (2013.01); *B60G 2204/40* (2013.01); *F16F 2230/105* (2013.01)

(58) Field of Classification Search
CPC ............. B60G 11/27; B60G 2202/152; B60G 2204/4308; B60G 2206/4222; B60G 2206/424; B60G 2204/125; B60G 2204/40; F16F 9/0463; F16F 9/38; F16F 9/05; F16F 2230/105

USPC .............. 267/64.27, 64.21, 64.24, 64.11, 120
See application file for complete search history.

(56) References Cited

U.S. PATENT DOCUMENTS

| | | | | |
|---|---|---|---|---|
| 3,010,715 | A | * | 11/1961 | Bordenkircher et al. .. 267/64.24 |
| 3,584,845 | A | * | 6/1971 | Hoffman ........................ 267/120 |
| 3,857,556 | A | * | 12/1974 | Wing .............................. 267/294 |
| 4,722,516 | A | * | 2/1988 | Gregg .......................... 267/64.27 |
| 5,129,634 | A | * | 7/1992 | Harris .......................... 267/64.24 |
| 5,591,513 | A | | 1/1997 | Mahling |

(Continued)

FOREIGN PATENT DOCUMENTS

DE    10 2008 026 219 A1    12/2009

*Primary Examiner* — Pamela Rodriguez
(74) *Attorney, Agent, or Firm* — Thomas R. Kingsbury; Fay Sharpe LLP (57) ABSTRACT

An elastomeric article and elastomeric thermal barrier system includes an elastomeric article that is at least partially formed from an elastomeric material susceptible to thermal degradation upon exposure to an external thermal energy source. An elastomeric thermal barrier extends around and along at least a portion of the elastomeric article. The elastomeric thermal barrier is spaced apart from the elastomeric article to form a thermal break. The elastomeric thermal barrier is at least partially formed from an elastomeric material having a thermal property that is different from the thermal property of the elastomeric article and is operative to provide at least one of reduced absorption, reduced conductivity, increased reflectance and reduced emissivity to reduce thermal energy transfer into the elastomeric article from the external thermal energy source. A gas spring and thermal barrier system and/or assembly and a suspension system are also included.

22 Claims, 5 Drawing Sheets

(56) References Cited

U.S. PATENT DOCUMENTS

| | | |
|---|---|---|
| 5,854,327 A | 12/1998 | Davis et al. |
| 6,786,476 B1* | 9/2004 | Kerstetter et al. ........... 267/64.11 |
| 6,845,973 B2* | 1/2005 | Ferrer ........................ 267/64.24 |
| 7,188,827 B2 | 3/2007 | Thomae et al. |
| 7,506,881 B2 | 3/2009 | Leonard |
| 8,979,076 B2* | 3/2015 | Oldenettel ................. 267/64.27 |
| 2005/0253316 A1* | 11/2005 | Harms et al. ............... 267/64.27 |
| 2006/0131797 A1 | 6/2006 | Kerstetter, III |
| 2006/0208402 A1* | 9/2006 | Keeney et al. ............. 267/64.11 |
| 2006/0226585 A1* | 10/2006 | Drain ........................ 267/64.27 |

* cited by examiner

ELASTOMERIC THERMAL BARRIER AS WELL AS GAS SPRING ASSEMBLY AND SUSPENSION SYSTEM INCLUDING SAME

This application claims priority from U.S. Provisional Patent Application No. 61/708,017 filed on Sep. 30, 2012, which is hereby incorporated herein by reference in its entirety.

BACKGROUND

The subject matter of the present disclosure broadly relates to the art of elastomeric articles and, more particularly, to an elastomeric thermal barrier for use in association with elastomeric articles, as well as gas spring assemblies and suspension systems that include one or more of such elastomeric thermal barriers.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with non-wheeled vehicles, elastomeric components for support structures, height adjusting systems and actuators associated with industrial machinery, components thereof and/or other such equipment. Accordingly, the subject matter of the present disclosure is not intended to be limited to use associated with elastomeric components of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Known gas suspension systems, such as for use on vehicles, for example, normally include one or more gas spring assemblies that utilize a flexible sleeve or bellows that is formed from elastomeric material. In many cases, the flexible sleeve or bellows will be formed from one or more layers or plies of elastomeric material (e.g., rubber) with one or more layers or plies of reinforcing material embedded therein. Regardless of the construction, however, the flexible sleeve or bellows at least partially defines a spring chamber that contains pressurized gas and permits the gas spring assemblies to support a load.

As a result of the relative movement between the sprung and unsprung masses of a vehicle, gas spring assemblies are routinely displaced between extended and compressed conditions, which results in repeated bending and unbending of the flexible sleeve or bellows. Furthermore, known gas suspension systems typically provide the capability of adjusting the height and/or alignment (i.e., leveling) of a sprung mass (e.g., a body or chassis of a vehicle) relative to an unsprung mass thereof (e.g., a wheel-engaging member or axle housing of the vehicle). Such actions can result in additional bending and unbending of the flexible sleeve or bellows of the gas spring assemblies.

Elastomeric devices, such as flexible sleeves and bellows, for example, may, under some conditions, experience a decrease in performance and/or other characteristics as a result of such cyclical flexing (i.e., bending and unbending), as a result of exposure to certain environmental conditions, and/or as a result of a combination of these factors. For example, it has been observed that exposure of certain elastomeric articles to elevated temperatures can disadvantageously increase the rate of oxygen ($O_2$) and/or ozone ($O_3$) degradation. When coupled with cyclic flexing and other conditions of use, such conditions of use can result in decreased performance and/or other characteristics of flexible sleeves and bellows of gas spring assemblies and/or other elastomeric devices.

Accordingly, it is believed desirable to develop elastomeric thermal barriers for use in association with elastomeric articles as well as gas spring assemblies and suspension systems including one or more of such elastomeric thermal barriers that overcome the foregoing and/or other disadvantages of known constructions.

BRIEF SUMMARY

One example of an elastomeric thermal barrier in accordance with the subject matter of the present disclosure can include a barrier wall that is at least partially formed from an elastomeric material. The barrier wall can include one or more features, properties and/or characteristics operative to impede, block or otherwise resist heat transfer into an associated elastomeric article from an associated external heat source. In some cases, the barrier wall can include one or more coatings or layers operative to reflect thermal energy, insulate the associated elastomeric article from thermal energy, and/or reduce absorption and/or transmission of thermal energy by the associated elastomeric article, and/or reduce emission of thermal energy toward the associated elastomeric article.

One example of an assembly in accordance with the subject matter of the present disclosure can include an elastomeric article and an elastomeric thermal barrier according to the foregoing paragraph. In some cases, the elastomeric thermal barrier can be secured on or along associated structural components. Additionally, in some cases, the elastomeric article can include a flexible wall of a gas spring assembly that may be susceptible to thermal degradation.

One example of a gas spring assembly in accordance with the subject matter of the present disclosure can include a gas spring and an elastomeric thermal barrier. The gas spring can include a flexible wall at least partially formed from an elastomeric material susceptible to thermal degradation. The flexible wall can extend circumferentially about a longitudinally-extending axis between opposing first and second ends. A first end member can be secured across the first end of the flexible wall, and a second end member can be secured across the second end of the flexible wall such that a spring chamber is at least partially defined by the flexible wall between the first and second end members. The elastomeric thermal barrier can extend lengthwise along at least the flexible wall, and can be spaced radially outwardly therefrom such that a gap is formed between the elastomeric thermal barrier and the flexible wall. In some cases, at least one end of the elastomeric thermal barrier can be secured on or along an end member.

One example of a suspension system in accordance with the subject matter of the present disclosure can include at least one assembly according to either of the foregoing paragraphs. The suspension system can also include one or more pressurized gas systems in fluid communication with one or more of the assemblies.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
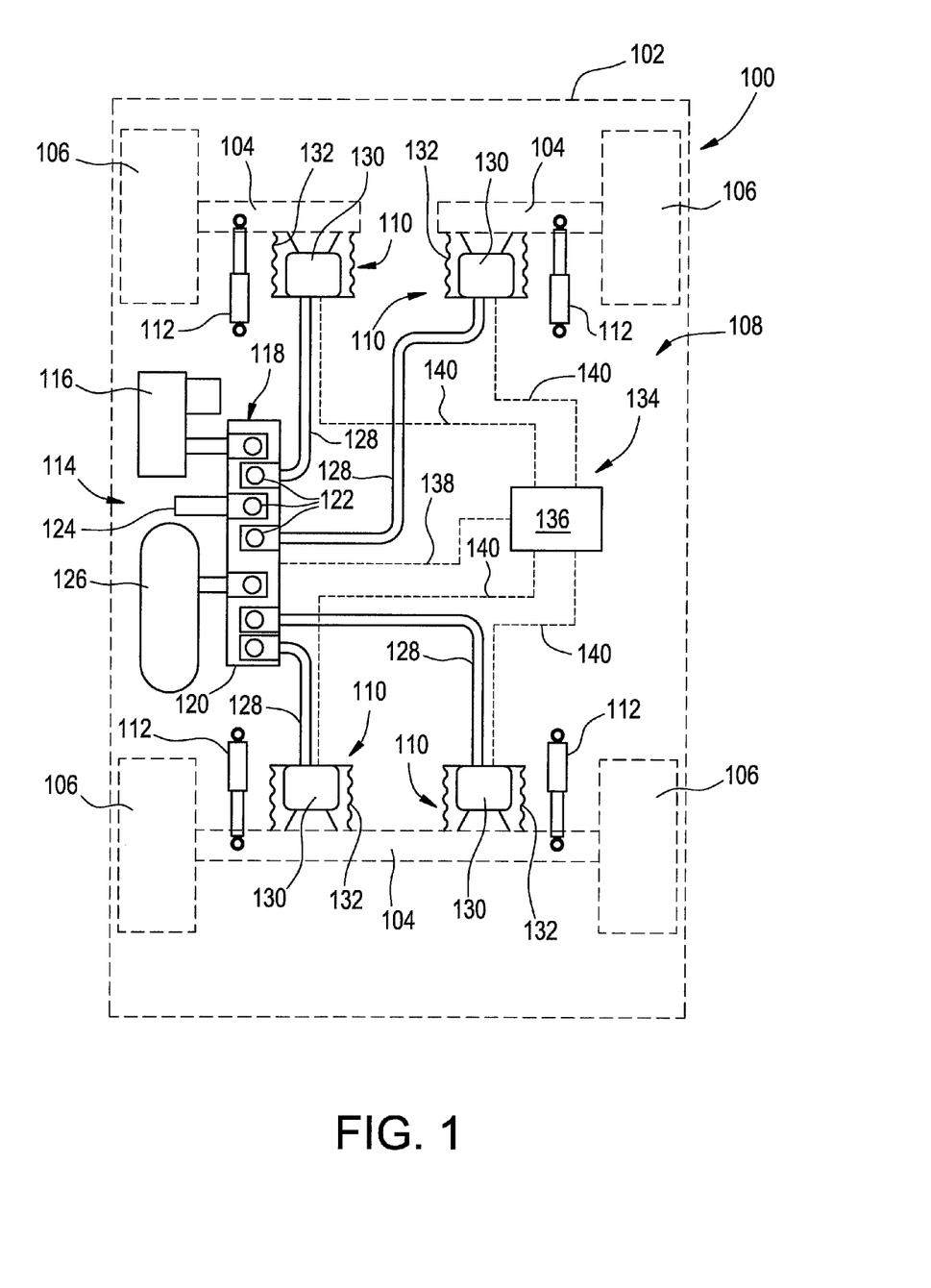
FIG. 1 is a schematic representation of one example of a suspension system of an associated vehicle including elastomeric thermal barriers in accordance with the subject matter of the present disclosure.

FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include one or more elastomeric articles that are disposed between the sprung and unsprung masses as well as one or more elastomeric thermal barriers disposed in operative association with the one or more elastomeric articles. In a preferred arrangement, the one or more elastomeric thermal barriers can include one or more features, properties and/or characteristics operative to impede or otherwise resist heat transfer into a corresponding one or more of the elastomeric articles from an external heat source, such as an environmental heat source or a vehicle component having an elevated temperature.

As one example, suspension system 108 is shown as including elastomeric articles and elastomeric thermal barriers in the form of assemblies 110 that are disposed between the sprung and unsprung masses, and can be secured thereto in any suitable manner. Assemblies 110 are shown in FIG. 1 as including include a gas spring and an elastomeric thermal barrier that is disposed radially outwardly from the gas spring. Assemblies 110 can be arranged or otherwise disposed between the sprung and unsprung masses in any suitable manner, configuration and/or arrangement. For example, assemblies 110 are shown in FIG. 1 as being disposed adjacent wheels 106. In many cases, a suspension system will include one or more damping members suitable for dissipating kinetic energy and/or dynamic inputs acting on the vehicle. Depending on desired performance characteristics and/or other factors, the suspension system can include damping members 112 of a typical construction that are provided separately from assemblies 110 and secured between the sprung and unsprung masses in a conventional manner. It will be appreciated, however, that damping members of other types and/or constructions could alternately be used.

Vehicle 100 also includes a pressurized gas system 114 that is in communication with assemblies 110 and that is operative to selectively supply pressurized gas thereto and exhaust pressurized gas therefrom. Pressurized gas system 114 can include a pressurized gas source, such as a compressor 116, for example. Additionally, a control device, such as a valve assembly 118, for example, is shown as being in communication with compressor 116 and can be of any suitable configuration or arrangement. In the exemplary arrangement shown, valve assembly 118 includes a valve block 120 with a plurality of valves 122 supported thereon. Valve assembly 118 can also optionally include a suitable exhaust, such as a muffler 124, for example, for venting pressurized gas from the system. Optionally, pressurized gas system 114 can also include a reservoir 126 in fluid communication with compressor 116 and/or valve assembly 118 and suitable for storing pressurized gas.

The one or more control devices, such as a valve assembly 118, for example, are operable for selectively distributing pressurized gas to, from and/or between the pressurized gas source or sources, the exhaust and/or the assemblies. As shown in the exemplary embodiment in FIG. 1, compressor 116, muffler 124 and reservoir 126 are in fluid communication with valve assembly 118 and can be selectively placed in fluid communication with one another by way of the valve assembly. Additionally, assemblies 110 are in fluid communication with valve assembly 118 by way of gas transmission lines 128 and, thus, can be selectively placed in communication with the compressor, reservoir, muffler and/or one another by way of the valve assembly. As such, pressurized gas can be selectively transferred into and/or out of the assemblies through valve assembly 118 by selectively operating valves 122, such as to alter or maintain vehicle height at one or more corners of the vehicle, for example.

It will be appreciated that assemblies 110 can take any suitable form, configuration and/or construction in accordance with the subject matter of the present disclosure. In the arrangement shown in FIG. 1, each assembly 110 includes a gas spring assembly 130, which may alternately be referred to herein as a "gas spring", and an elastomeric thermal barrier 132. It will be appreciated that gas spring assemblies 130 can be of any suitable type and/or kind, and will typically include opposing end members as well as a flexible wall that is secured between the end members to form a spring chamber (not numbered) that is operative to receive and retain a quantity of pressurized gas. Additionally, it will be appreciated that elastomeric thermal barriers 132 can be of any suitable size, shape, configuration and/or construction, and can be suitable for impeding, blocking or otherwise resisting heat transfer into at least the corresponding flexible walls of one or more of the gas spring assemblies, such as heat from an external heat source (e.g., an environmental heat source or an adjacent vehicle component having an elevated temperature).

In operation of the exemplary suspension system shown in FIG. 1, valve assembly 118 can be selectively actuated to transfer pressurized gas from the compressor and/or reservoir to one or more of assemblies 110 via one or more of gas transmission lines 128. Additionally, valve assembly 118 can be selectively actuated to exhaust pressurized gas from one or more of the assemblies through the gas transmission lines, such as by way of muffler 124 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Vehicle 100 also includes a control system 134 for selectively operating, adjusting or otherwise influencing or controlling the performance or one or more suspension system components, such as assemblies 110 and/or pressurized gas system 114, for example. Control system 134 can include an electronic control unit 136 communicatively coupled with one or more components of the pressurized gas system (e.g., compressor 116 and/or valve assembly 118), such as through a communication line 138, for example, for selective actuation and/or operation thereof. Electronic control unit 136 is also shown in FIG. 1 as being communicatively coupled with suitable height sensing devices (not shown in FIG. 1) that can optionally be used in association with assemblies 110. It will be appreciated that such communications can be implemented in any suitable manner, such as by way of communication lines 140, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with suspension control system 134, such as pressure sensors, accelerometers and/or temperature sensors, for example.

It will be appreciated that an elastomeric thermal barrier in accordance with the subject matter of the present disclosure can be operatively associated with an elastomeric article (e.g., a flexible wall of a gas spring assembly) in any suitable manner, and can be of any one of a wide variety of types, kinds, configurations and/or constructions. One example of a suitable arrangement of an elastomeric article and an elastomeric thermal barrier is represented in FIGS. 2-5 as an assembly 200 that is disposed between a first or upper structural component USC, such as associated vehicle body 102 in FIG. 1, for example, and a second or lower structural component LSC, such as one of associated axles 104, for example.

It will be appreciated that an elastomeric article (e.g., a flexible wall of a gas spring assembly) and an elastomeric thermal barrier in accordance with the subject matter of the present disclosure can be secured between the associated sprung and unsprung masses in any suitable manner. For example, a first end of the elastomeric article can be operatively connected (either directly or indirectly) to the associated sprung mass with a second end of the elastomeric article disposed toward and operatively connected (either directly or indirectly) to the associated unsprung mass. Additionally, a first end of the elastomeric thermal barrier could be operatively connected (either directly or indirectly) on or along the associated sprung mass with a second end of the elastomeric thermal barrier disposed toward and operatively connected (either directly or indirectly) to the associated unsprung mass. Alternately, either or both of the first and second ends of the elastomeric thermal barrier could be secured on or along (either directly or indirectly) the elastomeric article or a component associated therewith. As one example, the elastomeric article could be a flexible wall of a gas spring assembly, and one or both ends of the elastomeric thermal barrier could be secured (either directly or indirectly) on or along end members or other components of the gas spring assembly.

Figure 2:
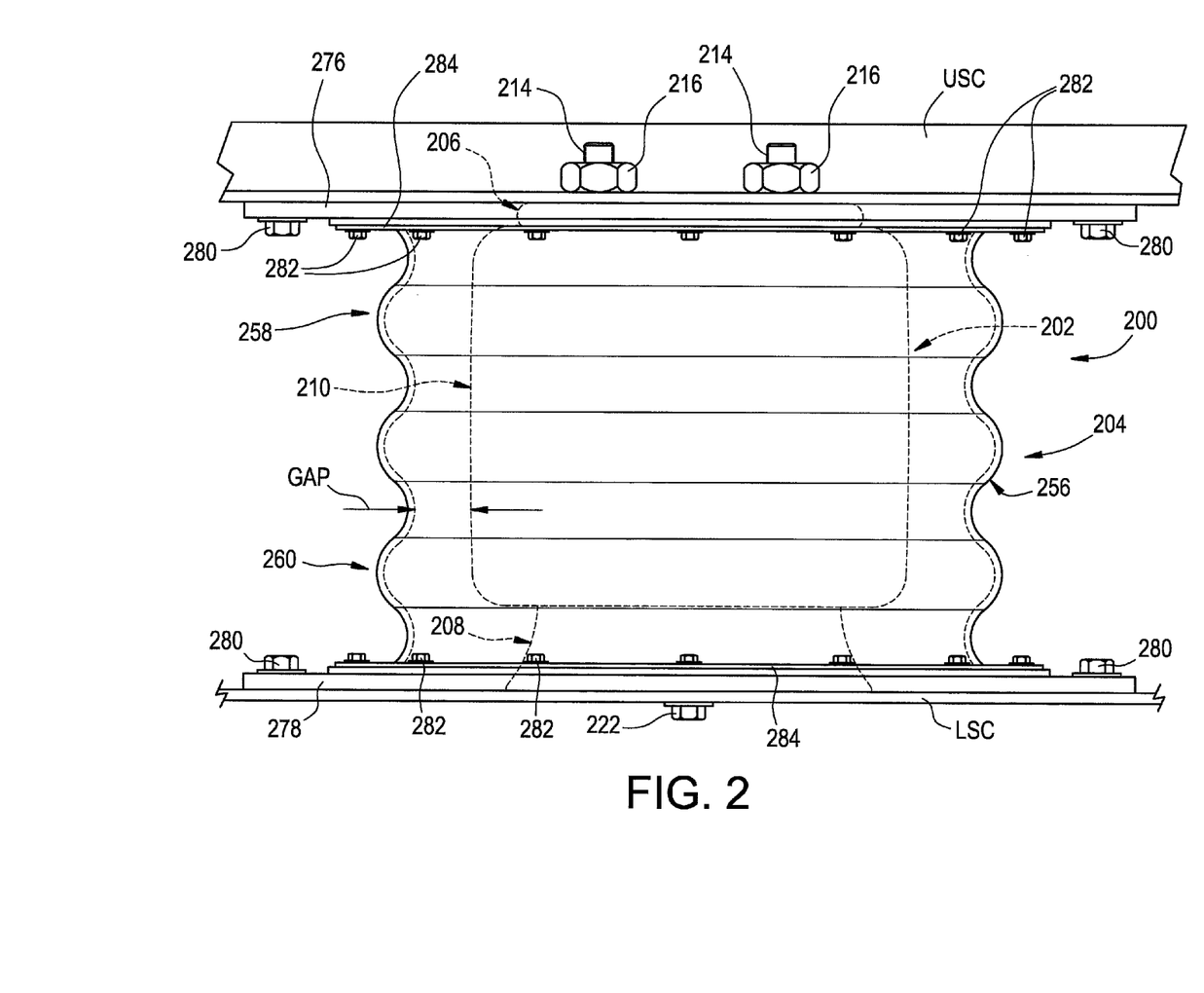
FIG. 2 is a side view of one example of an assembly including a gas spring and an elastomeric thermal barrier in accordance with the subject matter of the present disclosure.
Figure 3:
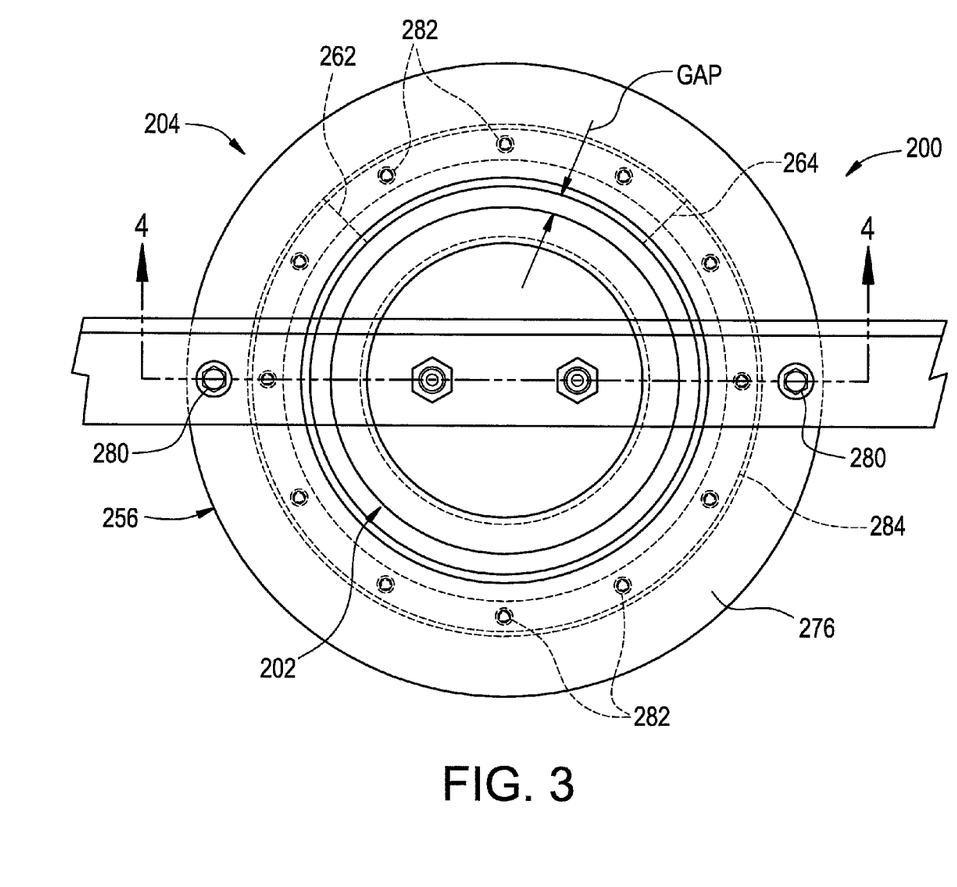
FIG. 3 is a top plan view of the assembly in FIG. 2.
Figure 4:
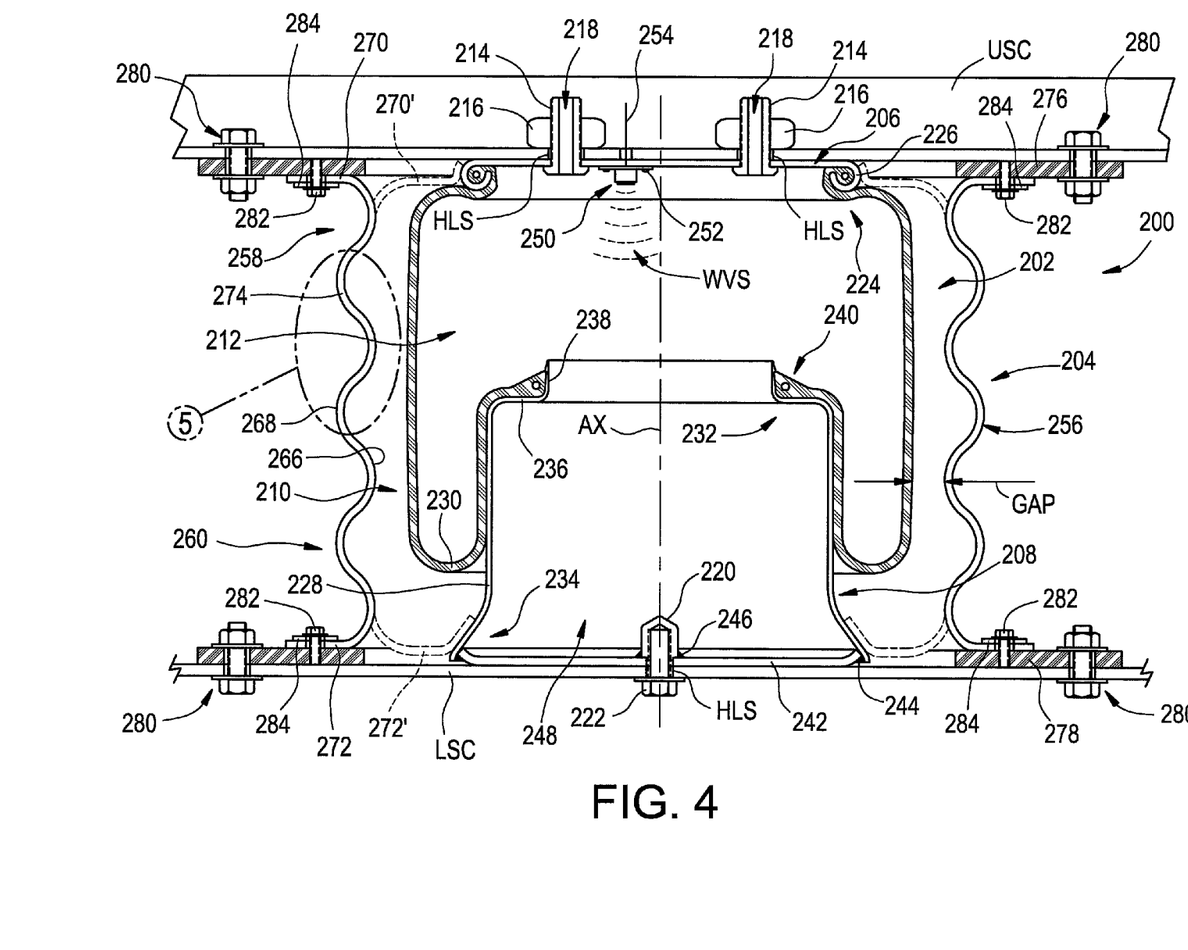
FIG. 4 is a cross-sectional side view of the assembly in FIGS. 2 and 3 taken from along line 4-4 in FIG. 3.

With further reference to FIGS. 2-4, assembly 200, which can be representative of assemblies 110 of suspension system 100 in FIG. 1, includes a gas spring assembly 202 and an elastomeric thermal barrier 204 disposed peripherally around at least a portion of the gas spring assembly. As identified in FIGS. 2-4, gas spring assembly 202 can include an end member 206, an end member 208 that is spaced from end member 206, and an elastomeric article in the form of a flexible wall 210 that is secured between the end members and at least partially defines a spring chamber 212 formed therebetween. Gas spring assembly 202 also includes a central axis AX extending longitudinally between the end members such that flexible wall 210 extends peripherally about the axis.

End member 206 is secured along first or upper structural component USC and can be secured thereon in any suitable manner. For example, one or more securement devices, such as mounting studs 214, for example, can be included along end member 206. In some cases, the one or more securement devices (e.g., mounting studs 214) can project outwardly from end member 206 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 216 or other securement devices, for example. As an alternative to one or more of mounting studs 214, one or more threaded passages (e.g., blind passages and/or through passages) could be used in conjunction with a corresponding number of one or more threaded fasteners.

Additionally, a fluid communication port, such as a transfer passage 218, for example, can optionally be provided to permit fluid communication with spring chamber 212, such as may be used for transferring pressurized gas into and/or out of the spring chamber, for example. In the exemplary embodiment shown, transfer passage 218 extends through at least one of mounting studs 214 and is in fluid communication with spring chamber 212. It will be appreciated, however, that any other suitable fluid communication arrangement could alternately be used.

End member 204 can be secured along second or lower structural component LSC in any suitable manner. As one example, lower structural component LSC could include one or more mounting holes HLS extending therethrough. In such case, a threaded mounting boss 220 could be operatively connected to end member 204 and accessible through one of mounting holes HLS to receive a corresponding threaded fastener 222, for example.

It will be appreciated that the one or more end members can be of any suitable type, kind, construction and/or configuration, and can be operatively connected or otherwise secured to the flexible wall in any suitable manner. In the exemplary arrangement shown in FIGS. 2 and 3, for example, end member 206 is of a type commonly referred to as a bead plate that is secured to a first end 224 of flexible wall 210 using a crimped-edge connection 226. End member 204 is shown in the exemplary arrangement in FIGS. 2 and 4 as being of a type commonly referred to as a piston (or a roll-off piston) that has an outer side wall 228 that abuttingly engages flexible wall 210 such that a rolling lobe 230 is formed therealong. As gas spring assembly 202 is displaced between extended and collapsed conditions, rolling lobe 230 is displaced along outer side wall 228 in a conventional manner.

As identified in FIG. 4, end member 208 extends generally between a first or upper end 232 and a second or lower end 234. One example of a connection between the flexible wall and the end member is shown in FIG. 4 in which end member 208 includes an end wall 236 disposed along end 232 and extending transverse to axis AX. An inner side wall 238 can extend longitudinally outwardly from end wall 236 in a direction away from end 234. Flexible wall 210 can include a second end 240 that is received along inner side wall 238 such that a substantially fluid-tight seal is formed therebetween. It is to be understood, however, that the arrangement shown and described is merely exemplary and that any other suitable construction and/or configuration can alternately be used.

End member 208 can also include a bottom wall 242 that is disposed along end 234 of the end member and can be secured on or along outer side wall 228 in any manner suitable for forming a substantially fluid-tight connection, such as by using a flowed-material joint 244, for example. In some cases, mounting boss 220 can be operatively connected to bottom wall 242 in a manner suitable for forming a substantially fluid-tight seal therewith, such as by using a flowed-material joint 246, for example. Additionally, end member 208 can include a chamber 248 that is formed therein and in fluid communication with spring chamber 212. In the exemplary arrangement shown, chamber 248 is at least partially defined by outer side wall 228, end wall 236, inner side wall 238 and bottom wall 242.

Gas spring assembly 202 can optionally include any number of one or more additional features, components and/or devices. For example, the gas spring assembly could include a jounce bumper (not shown) suitable for inhibiting direct contact between the end members of the gas spring assembly or other components of the suspension system. Additionally, a height or distance sensing device 250 can, optionally, be disposed within spring chamber 212, such as along end member 206, for example, and be secured therein in any suitable manner, such as by using fasteners 252, for example. Height sensing device 250 can be of any suitable type, kind and/or construction, such as an ultrasonic sensor that transmits and/or receives ultrasonic waves WVS, for example. Additionally, it will be appreciated that height sensing device 250 can be connected to other systems and/or components of a vehicle suspension system in any suitable manner. As shown in FIG. 4, height sensing device 250 includes a lead or connection 254 that can be used for such communication purposes, such as is indicated by leads 140 of control system 134 in FIG. 1, for example.

An elastomeric thermal barrier in accordance with the subject matter of the present disclosure, such as elastomeric thermal barrier 204, for example, can be formed from any suitable material or combination of materials suitable for undergoing extension and compression in response corresponding displacements of an associated elastomeric article, such as a flexible wall of a gas spring assembly, for example. Additionally, an elastomeric thermal barrier in accordance with the subject matter of the present disclosure, such as elastomeric thermal barrier 204, for example, can include any suitable combination of features, elements and/or components suitable for impeding, blocking or otherwise resisting heat transfer into the associated elastomeric article, such as heat from an external heat source (e.g., an environmental heat source or an adjacent vehicle component having an elevated temperature). Furthermore, it will be appreciated that an elastomeric thermal barrier in accordance with the subject matter of the present disclosure, such as elastomeric thermal barrier 204, for example, it can be of any suitable size, shape, configuration and/or arrangement, and can be secured in operative association with the associated elastomeric article in any suitable manner.

As one example, elastomeric thermal barrier 204 is shown in FIGS. 2-5 as including a barrier wall 256 that is at least partially formed from an elastomeric material and extends between opposing ends 258 and 260. Additionally, barrier wall 256 can have a peripheral length such that the elastomeric thermal barrier can be supported in operative association with an associated elastomeric article, such as by being positioned to extend at least partially around or otherwise along the associated elastomeric article. In some cases, barrier wall 256 can take the form of an endless, annular elastomeric sleeve or bellows that extends around the full periphery of an associated elastomeric article, such as is shown in FIGS. 2-4, for example. In other cases, barrier wall 256 can extend lengthwise between opposing wall edges, such as is represented by dashed lines 262 and 264 (FIG. 3). In such cases, the elastomeric thermal barrier may extend peripherally about or otherwise around less than the full periphery of the associated elastomeric article, such as is represented by wall edges 262 and 264.

Barrier wall 256 of elastomeric thermal barrier 204 can include an inside surface 266 and an outside surface 268. Additionally, the barrier wall can include a wall portion 270 disposed along end 258 and a wall portion 272 disposed along end 260 with an intermediate wall portion 274 disposed therebetween. As mentioned above, it will be appreciated that the barrier wall of the elastomeric thermal barrier can be secured on or along the elastomeric article, one or more components thereof, or an associated structure, in any suitable manner. In some cases, a wall portion could be secured on or along an end member of gas spring assembly 202. One example of such an arrangement is illustrated in FIG. 4 in which wall portion 270' is secured on end member 206. Additionally, or in the alternative, wall portion 272' is shown in FIG. 4 as being secured along end member 208. Regardless of the manner in which the elastomeric thermal barrier is supported, at least a portion of the barrier wall is preferably disposed in spaced-apart relation to the elastomeric article. In this manner, a thermal break can be formed between the elastomeric thermal barrier and the associated elastomeric article. One example of such an arrangement is illustrated in FIGS. 2-4 in which barrier wall 256 of elastomeric thermal barrier 204 is spaced radially outwardly from flexible wall 210 of gas spring assembly 202. In this manner, a thermal disconnect is formed between the flexible wall and the barrier wall, such as is represented by gap GAP.

In other cases, however, either or both of the ends of the barrier wall of an elastomeric thermal barrier can be secured (either directly or indirectly) on or along a structural component, such as upper structural component USC and/or lower structural component LSC, for example. In some cases, the barrier wall can be directly secured to a feature or element of an associated structural component. In other cases, the barrier wall can be secured to one or more support elements that can be connected to a feature or element of an associated structural component. In this manner, the barrier wall can be indirectly secured on or along a structural component.

One example of a suitable connecting arrangement is shown in FIGS. 2-4 in which assembly 200 includes a first or upper mounting element 276 disposed along upper structural component USC and a second or lower mounting element 278 disposed along lower structural component LSC. It will be appreciated that the mounting elements can be of any suitable size, shape, configuration and/or construction. For example, the mounting elements could take the form of plates having an outer peripheral edge and a central portion that can be disposed between the associated structural component and an end member of the gas spring assembly.

As another example, mounting elements 276 and 278 are shown as taking the form of annular rings that are respectively disposed in abutting engagement along structural components USC and LSC. It will be appreciated that mounting elements 276 and 278 can be secured to the structural components in any suitable manner, such as by way of a plurality of threaded fastener connections 280 and/or flowed-material joints (not shown), for example. Wall portion 270 is shown as being disposed in abutting engagement with mounting element 276 and can be secured thereto in any suitable manner, such as by way of a plurality of threaded fasteners 282 forming a threaded connection with the mounting element and/or flowed-material joints (not shown), for example. In some cases, one or more support elements, such as annular support rings 284 can be disposed in abutting engagement along the wall portions opposite mounting elements 276 and 278. In such cases, support rings 284 can clamp and secure the wall portions along the respective mounting elements.

An elastomeric thermal barrier in accordance with the subject matter of the present disclosure, such as elastomeric thermal barrier 204, for example, differs from conventional covers, protective boots, restraining cylinders and the like, in various respects. As one example, an elastomeric thermal barrier in accordance with the subject matter of the present disclosure can be disposed in spaced relation to the associated elastomeric article, such that a thermal break is formed therebetween. In such case, heat transfer in the form of thermal conductivity between the elastomeric thermal barrier and the associated elastomeric article can be minimized or at least partially reduced. As another example, an elastomeric thermal barrier in accordance with the subject matter of the present disclosure can include one or more features, properties and/or characteristics operative to impede or otherwise resist heat transfer into a corresponding one or more of the elastomeric articles from an external heat source, such as an environmental heat source or a vehicle component having an elevated temperature.

It will be recognized and appreciated that an elastomeric article with which an elastomeric thermal barrier is operatively associated will include thermal properties corresponding to the materials from which the elastomeric article is formed, such as absorption, conductivity, reflectance, emissivity and/or other properties and/or characteristics that may have a relation to heat transfer into and/or out of the elastomeric article. In many cases, conventional covers, protective boots, restraining cylinders and the like are formed from materials having thermal properties that are substantially similar to those of the associated elastomeric article. An elastomeric thermal barrier in accordance with the subject matter of the present disclosure has one or more thermal properties that differ substantially from the thermal properties of an associated elastomeric article. In this manner, an elastomeric thermal barrier in accordance with the subject matter of the present disclosure can impede, block or otherwise resist heat transfer into a corresponding one or more elastomeric articles from an external heat source. In such case, heat transfer in the form of thermal radiation from an external heat source to the associated elastomeric article can be minimized or at least partially reduced.

It will be appreciated that an elastomeric thermal barrier in accordance with the subject matter of the present disclosure can impede, block or otherwise resist heat transfer to in any one or more forms (e.g., conduction, convection and/or radiation) in any suitable manner and through the use of any combination of one or more materials in any suitable form, such as a substrate material and/or one or more coatings materials, for example.

As one example, barrier wall 256 of elastomeric thermal barrier 204 includes an inner surface 286 and an outer surface 288 and at least a portion of outer surface 288 of the barrier wall can a greater reflectance than at least a portion of the associated elastomeric article (e.g., flexible wall 210). In such case, heat transfer in the form of thermal radiation into the associated elastomeric article from an external heat source can be minimized or at least partially reduced due, at least in part, to the greater reflectance of the elastomeric thermal barrier than that of the associated elastomeric article.

It will be appreciated that such an increased reflectance can be achieved in any suitable manner, such as through the use of any combination of one or more materials, for example. As one example, outer surface 288 of barrier wall 256 include one or more reflective layers or coatings, which are represented by dashed line 290 in FIG. 5, such as may be suitable for generating increased spectral and/or diffuse reflection in comparison with the associated elastomeric article and/or and uncoated portion of barrier wall 256. Non-limiting examples of suitable reflective layers and/or coatings can include coatings having an increased surface finish (e.g., smoothness and/or shininess), such as glossy-finish polymeric layers and/or metallic coatings. As another example, outer surface 288 of barrier wall 256 can have a color that differs from the color of the associated elastomeric article and/or a remaining portion of the barrier wall. In some cases, the barrier wall can be at least partially covered by a coating or layer having a different color than that of the barrier wall. In other cases, the material from which the barrier wall is formed can be of a different color than that of the associated elastomeric article.

In some cases, an associated elastomeric article can have a color along one or more surfaces thereof that is darker that a color of one or more surfaces of the elastomeric thermal barrier, which would be lighter in color. It will be appreciated that relative differences in color can be determined in any suitable manner. As one example, color can be defined by an in RGB triplet having components R (red), G (green) and B (blue) with values between zero (0) and 255. In many cases, an associated elastomeric article may have a color with maximum values of 75 for all of the RGB components. In other cases, an associated elastomeric article may have a color with a maximum value of 225 for the sum of the RGB component values.

Additionally, in some cases, a minimum value for any one or more of the RGB components could be used to approximate a suitable color for the outside surface of the barrier wall. As one example, a value of approximately 150 or greater could be used for any one of the RGB components. As another example, a differential value of no more than approximately 100 could be used between the minimum component value and the maximum component value. As a further example, a minimum value of approximately 150 for the sum of the RGB component values could be used. In a preferred arrangement, a minimum value of approximately 450 for the sum of the RGB components can be used with a minimum value of approximately 150 for any one of the RGB components.

Figure 5:
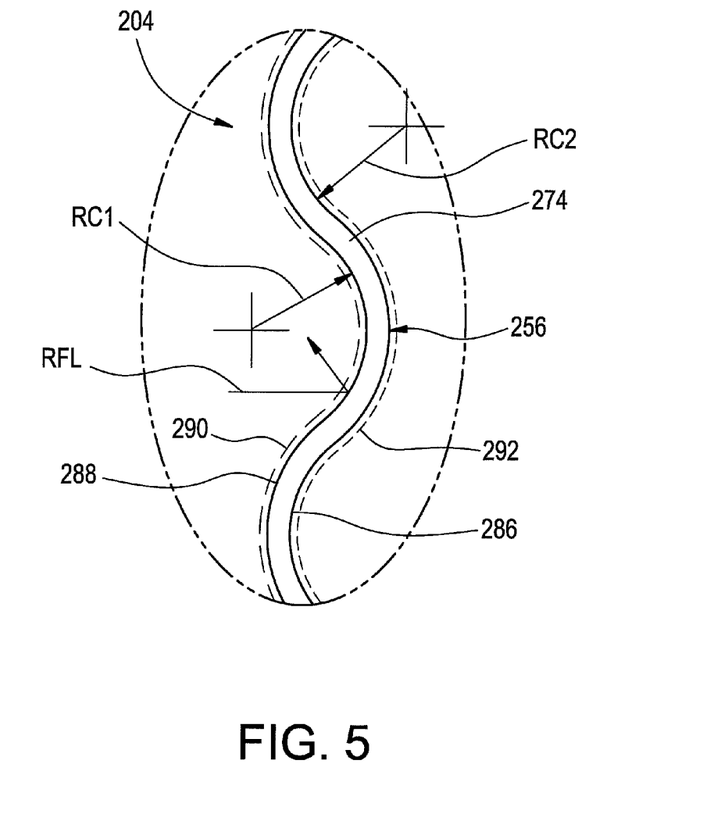
FIG. 5 is an enlarged view of the portion of the elastomeric thermal barrier in FIGS. 2-4 identified as Detail 5 in FIG. 4.

Another example of a manner in which an elastomeric thermal barrier in accordance with the subject matter of the present disclosure can impede, block or otherwise resist heat transfer can include utilizing a material having a reduced transmissibility in comparison with the transmissibility of an associated elastomeric article. If further example of a manner in which an elastomeric thermal barrier in accordance with the subject matter of the present disclosure can impede, block or otherwise resist heat transfer can include utilizing one or more coatings or layers having a reduced emissivity in comparison with the emissivity of the material of the elastomeric thermal barrier. In some cases, one or more low-emissivity coatings or layers can be disposed along at least a portion of inner surface 286 of barrier wall 256, as are represented in FIG. 5 by dashed line 292.

A further example of a manner in which an elastomeric thermal barrier in accordance with the subject matter of the present disclosure can include at least a portion of the barrier wall being physically shaped or otherwise configured to impede, block or otherwise resist heat transfer, such as by having improved spectral and/or diffuse reflectance in comparison with the associated elastomeric article. One example of such a construction is illustrated in FIGS. 1-5 in which barrier wall 254 includes a plurality of convolutions 294 that extend peripherally about at least a portion of elastomeric thermal barrier 204. In some cases, the plurality of convolutions can be formed from sections of barrier wall 254 that have cross-sectional radii of curvature, such as are represented in FIG. 5 by radii RC1 and RC2. In a preferred arrangement, the radii of curvature are configured such that at least spectral reflectance of thermal energy acting on barrier wall 254 will be directed away from the associated elastomeric article (e.g., flexible wall 210) and barrier wall 254 such that absorption of reflected energy can be minimized or at least reduced, such as is represented in FIG. 5 by arrow RFL.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring and elastomeric thermal barrier system comprising:
   a gas spring having a longitudinal axis and including a first end member, a second end member and a flexible wall extending peripherally about said axis, said flexible wall extending axially between a first end and a second end opposite said first end with said first end secured in a substantially fluid-tight manner to said first end member and said second end secured in a substantially fluid-tight manner to said second end member such that said flexible wall at least partially defines a spring chamber between said first and second end members, said flexible wall being at least partially formed from an elastomeric material susceptible to thermal degradation upon exposure to an associated external thermal energy source, and said flexible wall having a flexible wall color visible from along at least one surface thereof that at least partially establishes a wall thermal property value of said flexible wall for a first thermal property; and,
   an elastomeric thermal barrier extending peripherally around and axially along at least a portion of said flexible wall, said elastomeric thermal barrier spaced radially outward from at least said flexible wall of said gas spring such that a gap establishing a thermal disconnect is formed between said elastomeric thermal barrier and at least said flexible wall, said elastomeric thermal barrier including a barrier wall with an exterior surface, said barrier wall being at least partially formed from a flexible barrier material and said barrier wall having a barrier wall color along at least said exterior surface that at least partially establishes a barrier thermal property value of said barrier wall for said first thermal property, said barrier wall color being lighter than said flexible wall color such that said barrier thermal property value for said first thermal property is different from said wall thermal property value for said first thermal property such that said difference in color is operative to reduce transmission of thermal energy from the associated external thermal energy source into said flexible wall through said elastomeric thermal barrier.

2. A system according to claim 1, wherein said first thermal property includes at least one of reduced absorption, reduced conductivity, increased reflectance and reduced emissivity.

3. A system according to claim 1, wherein said barrier wall includes a coating that at least partially establishes said barrier thermal property value for said first thermal property and is operative to insulate at least one of said flexible wall and said barrier wall from thermal energy transfer from an associated external thermal energy source.

4. A system according to claim 1, wherein said barrier wall includes a coating that at least partially establishes said barrier thermal property value for said first thermal property and is operative to reduce emission of thermal energy from said barrier wall toward said flexible wall.

5. A system according to claim 1, wherein said barrier wall includes a coating that at least partially establishes said barrier thermal property value for said first thermal property and is operative to reflect thermal energy from an associated external thermal energy source in a direction away from said flexible wall.

6. A system according to claim 1, wherein said color of said flexible wall is defined by an RGB triplet with component colors red (R), green (G) and blue (B) that either:
   a) each have a value of 75 or less; or
   b) have a maximum value of 225 for a sum of the RGB component values.

7. A system according to claim 1, wherein said color of said barrier wall is defined by an RGB triplet with component colors red (R), green (G) and blue (B) each having a minimum value of 150.

8. A system according to claim 1, wherein said color of said barrier wall is defined by an RGB triplet with component colors red (R), green (G) and blue (B) having a minimum value of 150 for a sum of the RGB component values.

9. A system according to claim 8, wherein said color of said barrier wall is defined by an RGB triplet with component colors red (R), green (G) and blue (B) having a minimum value of 450 for the sum of the RGB component values.

10. A system according to claim 1, wherein said barrier wall includes a plurality of convolutions that extend peripherally about said axis, said plurality of convolutions being formed from sections of said barrier wall having cross-sectional radii of curvature configured such that spectral reflectance of thermal energy acting on said barrier wall will be directed outwardly away from said flexible wall.

11. A system according to claim 1, wherein said gas spring is axially-displaceable during use between an extended condition and a compressed condition, and said elastomeric thermal barrier includes a barrier wall that is at least partially formed from a material suitable for undergoing extension and compression in response to corresponding displacements of said gas spring.

12. A system according to claim 1, wherein said elastomeric thermal barrier extends axially between opposing first and second ends with said first end of said elastomeric thermal barrier being disposed in operative engagement with said first end member.

13. A system according to claim 1, wherein said gas spring includes a mounting element disposed adjacent said first end member and said first end of said elastomeric thermal barrier is secured along said mounting element.

14. A system according to claim 1, wherein said elastomeric thermal barrier extends around the full periphery of said gas spring.

15. A system according to claim 1, wherein said elastomeric thermal barrier includes a barrier wall with opposing wall edges extending axially along said barrier wall, and said elastomeric thermal barrier extends around less than the full periphery of said gas spring.

16. An elastomeric article and elastomeric thermal barrier system comprising:
   an elastomeric article being at least partially formed from an elastomeric material susceptible to thermal degradation upon exposure to an associated external thermal energy source, said elastomeric article having an article outer surface with an article surface color visible from along said article outer surface that at least partially establishes a first thermal property value of said elastomeric article for a first thermal property, said article surface color being defined by an RGB triplet with component colors of red (R), green (G) and blue (B) that either each have a value of 75 or less or have a maximum value of 225 for a sum of the RGB component values; and,
   an elastomeric thermal barrier extending peripherally around and along at least a portion of said elastomeric article, said elastomeric thermal barrier spaced radially outward from at least a portion of said elastomeric article such that a gap establishing a thermal disconnect is formed between said elastomeric thermal barrier and at least a portion of said elastomeric article, said elastomeric thermal barrier having an outer barrier surface with a barrier surface color visible from along at least said barrier outer surface that at least partially establishes a second thermal property value of said elastomeric thermal barrier for said first thermal property, said barrier surface color being defined by an RGB triplet with component colors red (R), green (G) and blue (B) each having a minimum value of 150 such that said article surface color and said barrier surface color have a color difference with a reduced transmission of thermal energy from an associated external thermal energy source by said elastomeric thermal barrier relative to said flexible spring member at least partially resulting from said color difference.

17. A system according to claim 16, wherein said first thermal property includes at least one of reduced absorption, reduced conductivity, increased reflectance and reduced emissivity.

18. A system according to claim 17, wherein said barrier wall includes a coating that at least partially establishes said second thermal property value and is operative to insulate at least one of said elastomeric article and said barrier wall from thermal energy transfer from an associated external thermal energy source.

19. A system according to claim 17, wherein said barrier wall includes a coating that at least partially establishes said second thermal property value and is operative to reduce emission of thermal energy from said barrier wall toward said elastomeric article.

20. A system according to claim 17, wherein said barrier wall includes a coating that at least partially establishes said second thermal property value and is operative to reflect thermal energy from an associated external thermal energy source in a direction away from said elastomeric article.

21. A gas spring and elastomeric thermal barrier system comprising:
   a gas spring having a longitudinal axis and including:
      a first end member;
      a second end member; and,
      a flexible spring member extending peripherally about said axis and having an inner surface and an outer surface, said flexible spring member extending longitudinally between a first end secured in a substantially fluid-tight manner to said first end member and a second end secured in a substantially fluid-tight manner to said second end member such that said inner surface of said flexible spring member at least partially defines a spring chamber between said first and second end members, said flexible spring member being at least partially formed from an elastomeric material susceptible to thermal degradation upon exposure to an associated external thermal energy source, and said flexible spring member having a spring surface color visible from along said outer surface that at least partially establishes a first thermal property value of said flexible spring member for a first thermal property, said spring surface color being defined by an RGB triplet with component colors of red (R), green (G) and blue (B) that either each have a value of 75 or less or have a maximum value of 225 for a sum of the RGB component values; and, an elastomeric thermal barrier extending peripherally around and axially along at least a portion of said flexible spring member, said elastomeric thermal barrier spaced radially outward from at least said flexible spring member of said gas spring such that a gap establishing a thermal disconnect is formed between said elastomeric thermal barrier and at least said flexible spring member, said elastomeric thermal barrier having an outer surface with a barrier surface color visible from along at least said outer surface that at least partially establishes a second thermal property value of said elastomeric thermal barrier for said first thermal property, said barrier surface color being defined by an RGB triplet with component colors red (R), green (G) and blue (B) each having a minimum value of 150 such that said spring surface color and said barrier surface color have a color difference with a reduced transmission of thermal energy from the associated external thermal energy source by said elastomeric thermal barrier relative to said flexible spring member at least partially results from said color difference.

22. A gas spring and elastomeric thermal barrier system according to claim 21, wherein said elastomeric thermal barrier includes a barrier wall with a plurality of convolutions that extend peripherally about said axis, said plurality of convolutions being formed from sections of said barrier wall having cross-sectional radii of curvature configured such that spectral reflectance of thermal energy acting on said elastomeric thermal barrier will be directed outwardly away from said flexible spring member.

* * * * *